(12) United States Patent
Murillo, Jr.

(10) Patent No.: US 11,352,949 B2
(45) Date of Patent: Jun. 7, 2022

(54) TOP DEAD CENTER GAUGE SET

(71) Applicant: Victor Murillo, Jr., Jurupa Valley, CA (US)

(72) Inventor: Victor Murillo, Jr., Jurupa Valley, CA (US)

( * ) Notice: Subject to any disclaimer, the term of this patent is extended or adjusted under 35 U.S.C. 154(b) by 340 days.

(21) Appl. No.: 16/773,096

(22) Filed: Jan. 27, 2020

(65) Prior Publication Data
US 2021/0231049 A1    Jul. 29, 2021

(51) Int. Cl.
*F02B 77/08* (2006.01)
*G01B 5/14* (2006.01)
*G01B 5/04* (2006.01)
*F02B 75/04* (2006.01)

(52) U.S. Cl.
CPC .......... *F02B 77/087* (2013.01); *G01B 5/043* (2013.01); *G01B 5/143* (2013.01); *F02B 75/041* (2013.01)

(58) Field of Classification Search
CPC ......... F02B 77/087; G01B 5/14; G01B 5/143; G01B 5/043; G01B 5/02; G01B 3/28; G01M 15/06
See application file for complete search history.

(56) References Cited

U.S. PATENT DOCUMENTS

| | | | |
|---|---|---|---|
| 1,611,062 A * | 12/1926 | Peebles | G01M 15/06 33/DIG. 15 |
| 2,072,984 A | 3/1937 | Haskins | |
| 2,471,746 A | 5/1949 | Hilbert | |
| 2,819,534 A | 6/1956 | Kitzman | |
| 2,776,494 A * | 1/1957 | Sheppard | G01B 5/252 33/611 |
| 3,076,332 A * | 2/1963 | Lopes | F02P 17/04 73/114.64 |
| 3,744,142 A * | 7/1973 | Marshall | B25B 27/0035 33/DIG. 15 |
| 3,765,098 A * | 10/1973 | Schafer, Sr. | G01M 15/06 33/DIG. 15 |
| 4,393,693 A | 7/1983 | Naito | |
| 5,459,940 A | 10/1995 | McKenzie | |
| 5,827,954 A * | 10/1998 | Noland | F01L 1/46 33/DIG. 15 |
| 6,272,910 B1 | 8/2001 | Noland | |

* cited by examiner

*Primary Examiner* — Grant Moubry
(74) *Attorney, Agent, or Firm* — Kirk A. Buhler; Buhler & Associates Patenting

(57) ABSTRACT

Improvements in a mechanism that determines top dead center of an internal combustion engine where detecting the top of the stroke can be difficult to determine as the crank is being rotated. The gauge set mounts into a spark plug or fuel injector hole. These holes are usually a tapped hole where the piston position gauge can be threaded into, to provide a stable and concentric mount where the measurement pin passes through the exterior threaded shaft of the mount. A pin extends into the cylinder to determine when the piston is approaching and at the top of the cylinder. The mount is an elongated stalk that allows for additional cam gauges where the cam gauges can be mounted and linearly adjustable on the single stalk. The measurement is with dial indicators so a user can measure three varying engine parts to determine the top-dead-center.

20 Claims, 5 Drawing Sheets

Figure 1:
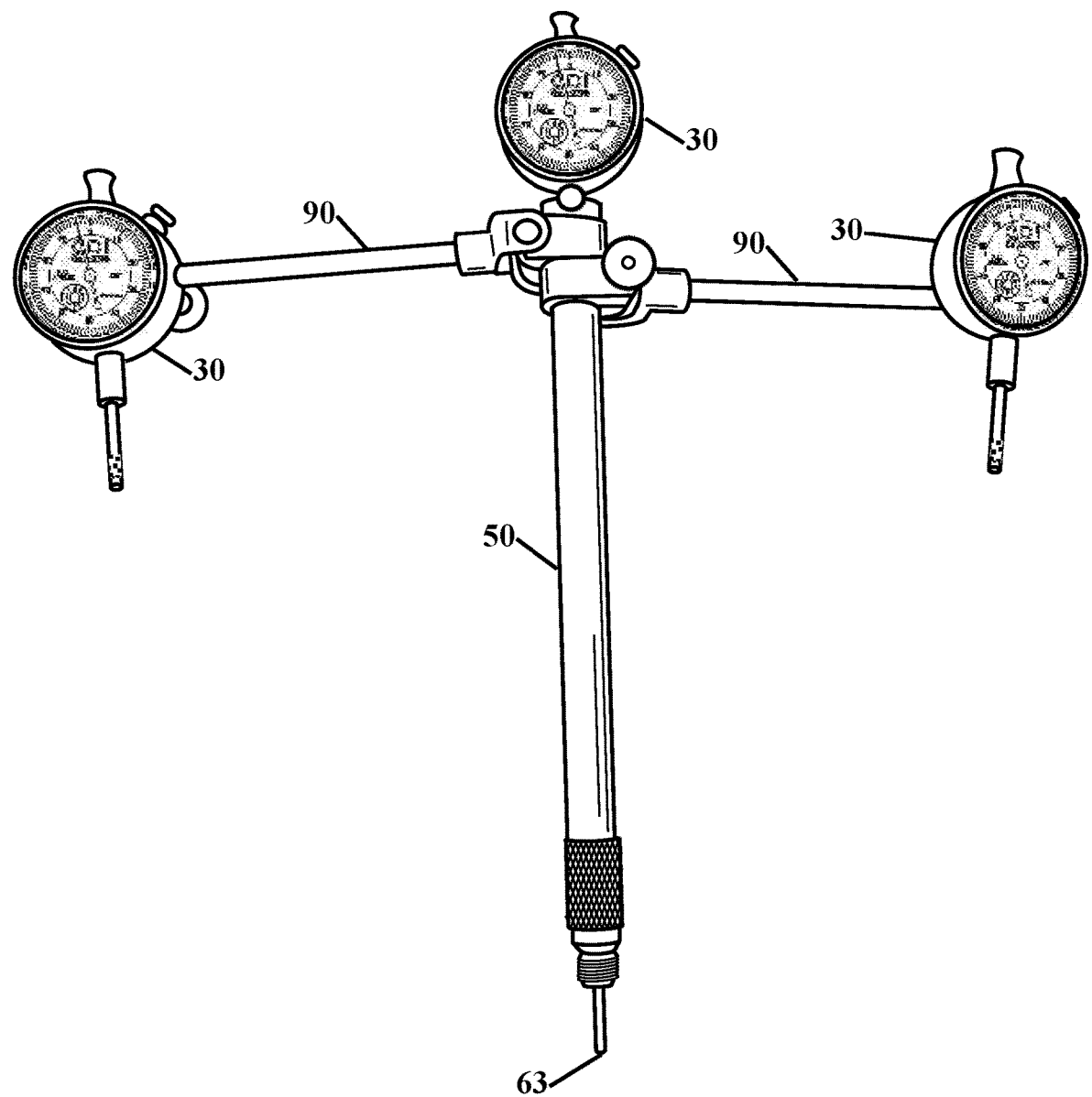

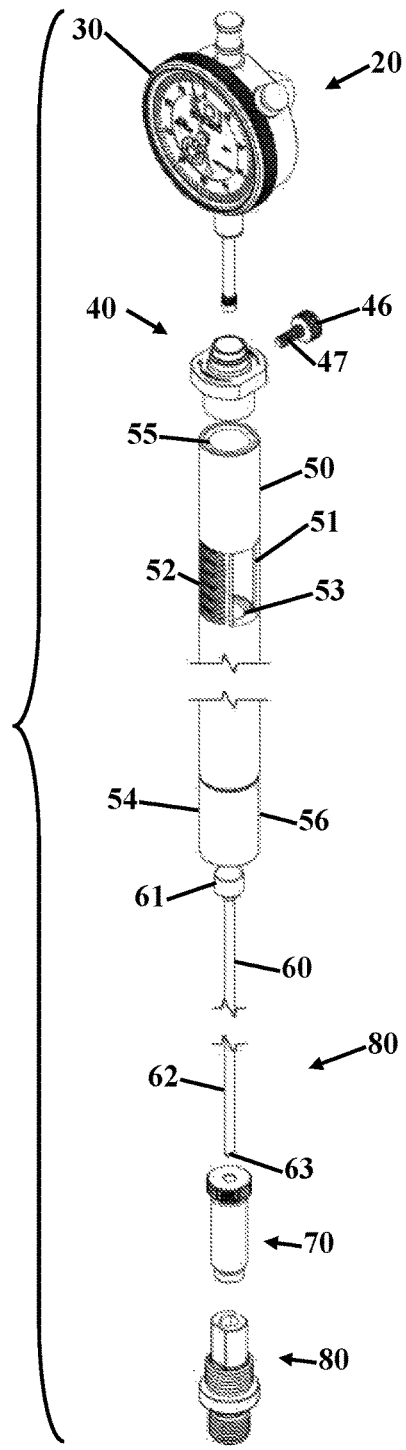
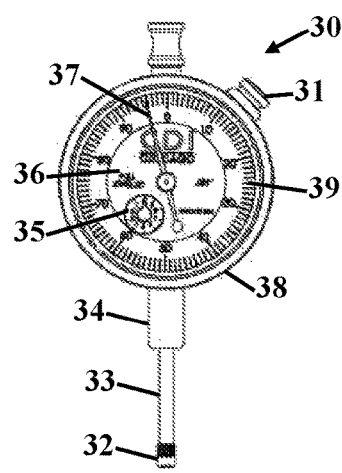
FIG. 4
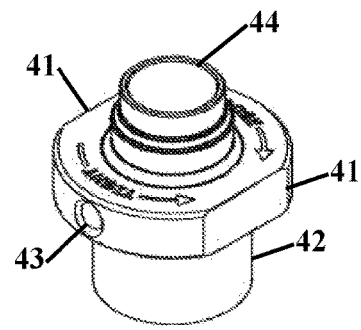
FIG. 5
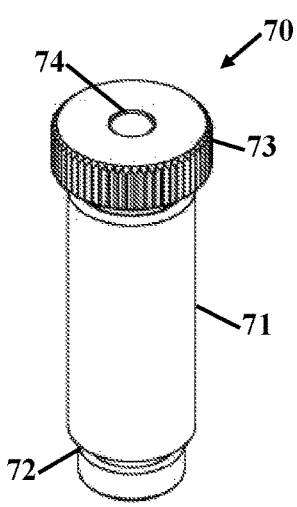
FIG. 6
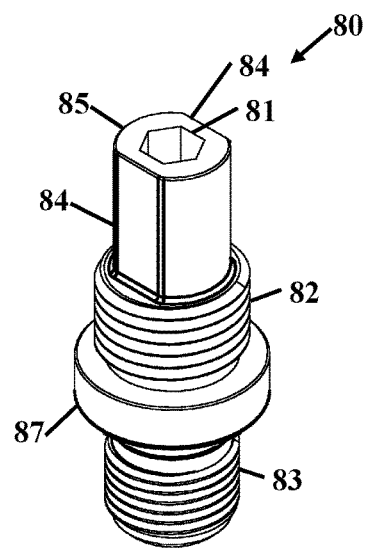
FIG. 7
FIG. 3

TOP DEAD CENTER GAUGE SET

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in determining the top dead center of an internal combustion engine. More particularly, the present top dead center gauge set uses a plurality of dial indicator gauges that measure the piston position and valvetrain at the same time.

DESCRIPTION OF RELATED ART INCLUDING INFORMATION DISCLOSED UNDER 37 CFR 1.97 AND 1.98

When the timing of internal combustion vehicles is being set, the most important factor is determining the top-dead-center of a piston. This is the position of a piston when the piston is at the apex of the stroke. Because the piston is enclosed within the cylinder of an engine it can be difficult to determine the exact position of the piston as it is being moved by the crank. In addition to the position of the piston, there are intake and exhaust valves that operate. One or two cams operate the valves, and they also should be at the optimal position when the piston is at the top of the stroke. While the position of the piston and valves/cam is synchronized by a timing belt or a timing chain when an engine is disassembled the position and linking of the crank shaft and camshaft requires identifying the rotational position of each of these independent items and synchronizing them with the position of the rotor and points to be able to operate the engine for proper ignition.

A number of patents and or publications have been made to address these issues. Exemplary examples of patents and or publication that try to address this/these problem(s) are identified and discussed below.

U.S. Pat. No. 6,272,910 issued on Aug. 14, 2001 to Bruce E. Noland and is titled Camshaft Degreeing Platform. This patent discloses a measurement platform for an overhead cam shaft type internal combustion engine having at least one piston reciprocable within a cylinder formed in a block; an intake valve and an exhaust valve for the cylinder, wherein intake and exhaust cam lobes on the cam shaft engage upper ends of respective intake and exhaust valve stems, the platform comprising at least one relatively rigid bridge component including a pair of mounting flanges at opposite ends thereof, the mounting flanges having fastener holes aligned with fastener holes in the engine head on opposite sides of the cam shaft, While this patent measures the position of the camshaft it does not measure the piston position.

U.S. Pat. No. 2,471,746 issued on May 31, 1949 to R. Hilbert and is titled Gauge Tool for Timing Diesel Engines. This patent discloses an engine timing tool with a rigid body member having a base portion that rests horizontally on a cylinder head bridging a recess in the cylinder head. The tool has a gauge mechanism that fits down the fuel injector hole to determine the position of the piston. A second gauge mechanism measures the position of the fuel injector pushrod. This patent does not use a sensor that is inserted into the spark plug hole and further does not measure the position of the intake an exhaust cams.

U.S. Pat. No. 2,819,534 issued on Jan. 14, 1958 to M. P. Kitzmen and is titled Tool for Adjusting Valve Mechanisms. U.S. Pat. No. 4,393,693 issued on Jul. 19, 1983 to Tadashi Naito and is titled Apparatus and Method for Detecting Crank Shaft Orientation and Valve Assembly in an Internal Combustion Engine Tool for Adjusting Valve Mechanisms. Both of these patents use gauges that measure the position of the top of a valve spring to determine position. While they use dial indicators, they do not measure the cam position or the piston position directly.

What is needed is mechanism that is able to measure all of the moving parts of an engine to determine the actual position of the moving parts to allow a mechanic to locate the exact top dead center of the rotating mechanical components. The top dead center gauge set disclosed in the document provides the solution.

BRIEF SUMMARY OF THE INVENTION

It is an object of the top dead center gauge to be secured using the spark plug hole or any other axis hole into the engine cylinder and or combustion chamber. These axis holes may be threaded holes in the cylinder head and or engine block, where the spark plug adaptor on the bottom end section of the top dead center gauge will be secured to, providing a stable, rigid and concentric base to ensure repeatability of the measurements to be taken.

It is another object of the top dead center gauge to be in single stalk form. It is in single stock form that the instrumentation can be mounted to, so to relay piston position.

It is another object of the top dead center gauge, when in single stock form, to have a gauge mount at the top end section, providing a stable platform for which instruments can be mounted to.

It is another object of the top dead center gauge to allow any exposed surface of the top dead center gauge body to be used as a grip point, from which in single stock form, the top dead center gauge can be inserted and removed from the engine cylinder and or combustion chamber. It has been contemplated that the instrument mount may be used as grip point with left-handed thread.

It is another object of the top dead center gauge to engage with the piston as the piston approaches the upper most limit of its stroke or its top dead center. The engagement occurs when the piston makes contact with the shaft tip of the indicator shaft which extends out from the spark plug adaptor, threaded into the spark plug hole. The indicator shaft translates movement of the piston through the spark plug adaptor, and through the body of the top dead center gauge, where it then makes contact with the attached instrument at the top end of the top dead center gauge. The instrumentation converts the linear motion of the piston into incremental positions displayed as an indicium of graduated hash lines with an indicating needle; which in this configuration, the instrument would be called a dial indicator. As the piston moves upward towards top dead center, the indicating needle will complete several rotations in one direction. It will require that the user go passed top dead center to determine the transition point in which the needle rotates in the opposite direction from its original direction, indicating that the piston is moving down away from top dead center. Once the transition point has been determined, the user must rotate the crank back, passed top dead center, noting the transition point, and again rotate the crank in the direction of engine rotation towards top dead center. Once the indicating needle approaches the transition point, the rotation of the crank is stopped at the transition point at which the user rotates the dial indicator face to zero position to indicate that the piston has reached the top dead center of its stroke. It has been contemplated that the instrumentation may be light emitting, audible, mechanical and electronic, providing similar detection for the top dead center of the piston.

It is another object of the top dead center gauge to accommodate for a variation of engine types. While the entire stroke of the piston is usually not measured, the indicator shaft protrudes at a predetermined distance into the engine cylinder, and or combustion chamber where the piston can come into contact with the shaft tip. In some engines, combustion chamber and piston designs vary from manufactures to achieve specific performance goals. Combustion chambers can be flat or concave, depending on the number of valves, and pistons can be convex, concave or flat. The top dead center gauge can accommodate any engine variation by simply rotating the indicator shaft adjuster to extend or retract the indicator shaft for a shallower or deeper penetration into the engine cylinder and or combustion chamber. In severe cases, the indicator shaft can be replaced with a size that would accommodate a specific engine application. It has been contemplated that the indicator shaft may be mated to or part of the dial indicator as one continuous pin.

It is another object of the top dead center gauge to thread into a variety of spark plug or accesses holes into the engine cylinder, and or combustion chamber. Engine manufactures use different size spark plugs to ignite air, fuel ratios in an internal combustion engine. The top dead center gauge may have a plurality of spark plug adaptors to accommodate for different size threads and thread pitches.

It is another object of the top dead center gauge to accept a plurality of spark plug adaptors. The spark plug adaptor may be secured at the bottom end of the top dead center gauge by a collar.

It is another object of the top dead center gauge to detect that the valvetrain is in the correct phase such that intake and exhaust valves are in closed position relative to piston top dead center. The intake and exhaust valves are driven by cam shaft(s) which are connected to the crankshaft. In some engines there may be a single cam shaft that operates both the intake and exhaust vales, while other engines use separate cam shafts for individual banks of intake and exhaust valves. Synchronizing the valvetrain in relation to the piston is most critical to achieve optimal performance of an engine. Utilization of the top dead center gauge allows one to visually and audibly detect piston and valvetrain position.

It is another object of the top dead center gauge to measure items that move relative to the crank rotation. These items can include, but not limited to valve stems, valve springs, spring retainer, valve keepers, rocker arms, push rods, hydraulic/solid lifters, and cam shafts.

It is an another of the top dead center gauge to provide a rigid support structure to secure the instrumentation for shafts that extend outward from the stalk, providing adjustability of the instrumentation.

It is still another object of the top dead center gauge to relay information of piston and valvetrain position by the use of mechanical numerical dial indicator, digital numerical dial indicator, light emitting indicator and even an auditable indicator to indicate piston and valvetrain position. While dial indicators may have limited numeric increments of inches or millimeters of 0.01, 0.001 or 0.0001, the movement of the indicating needle in the mechanical display and numerical change in the digital display can give the user a visual indication of the rate of movement of the piston and valvetrain.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
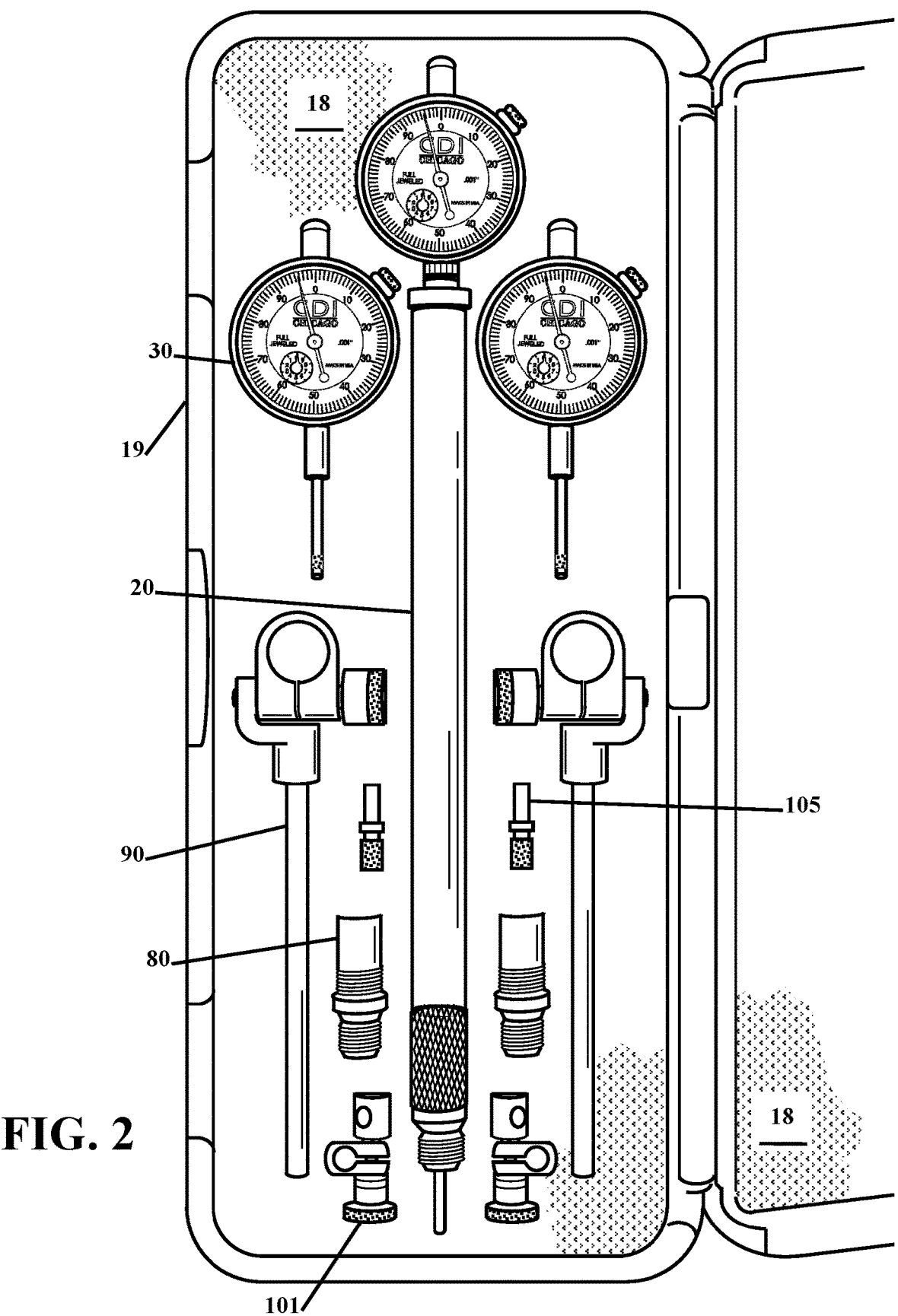
Figure 8:
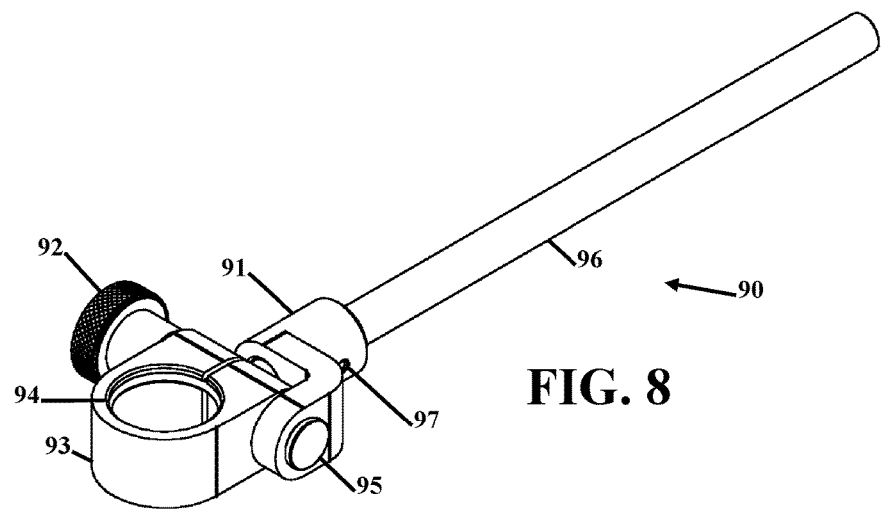
Figure 9:
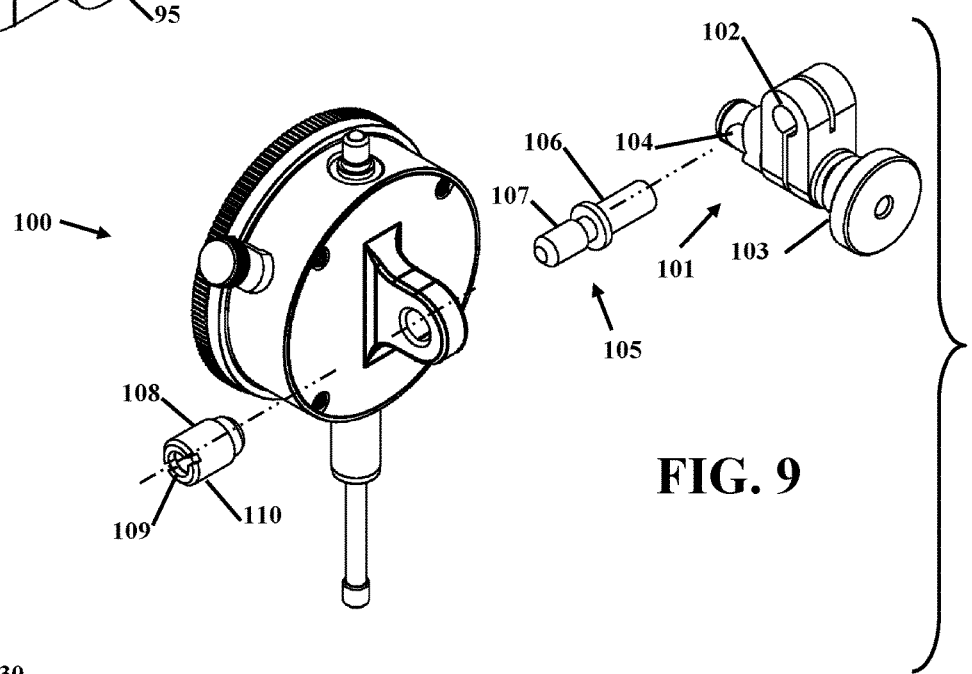
Figure 10:
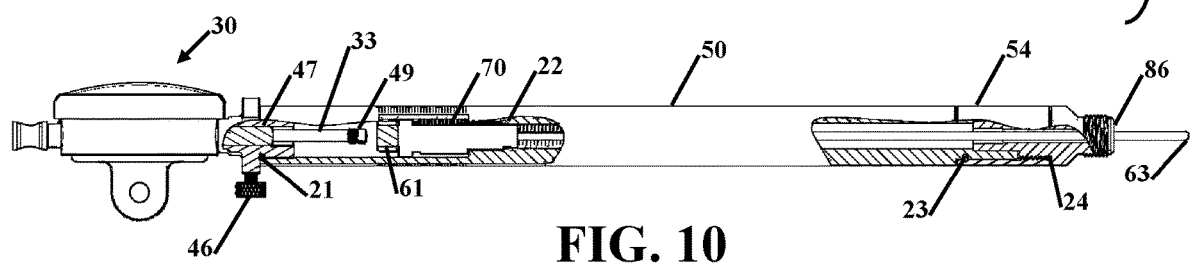
Figure 11:
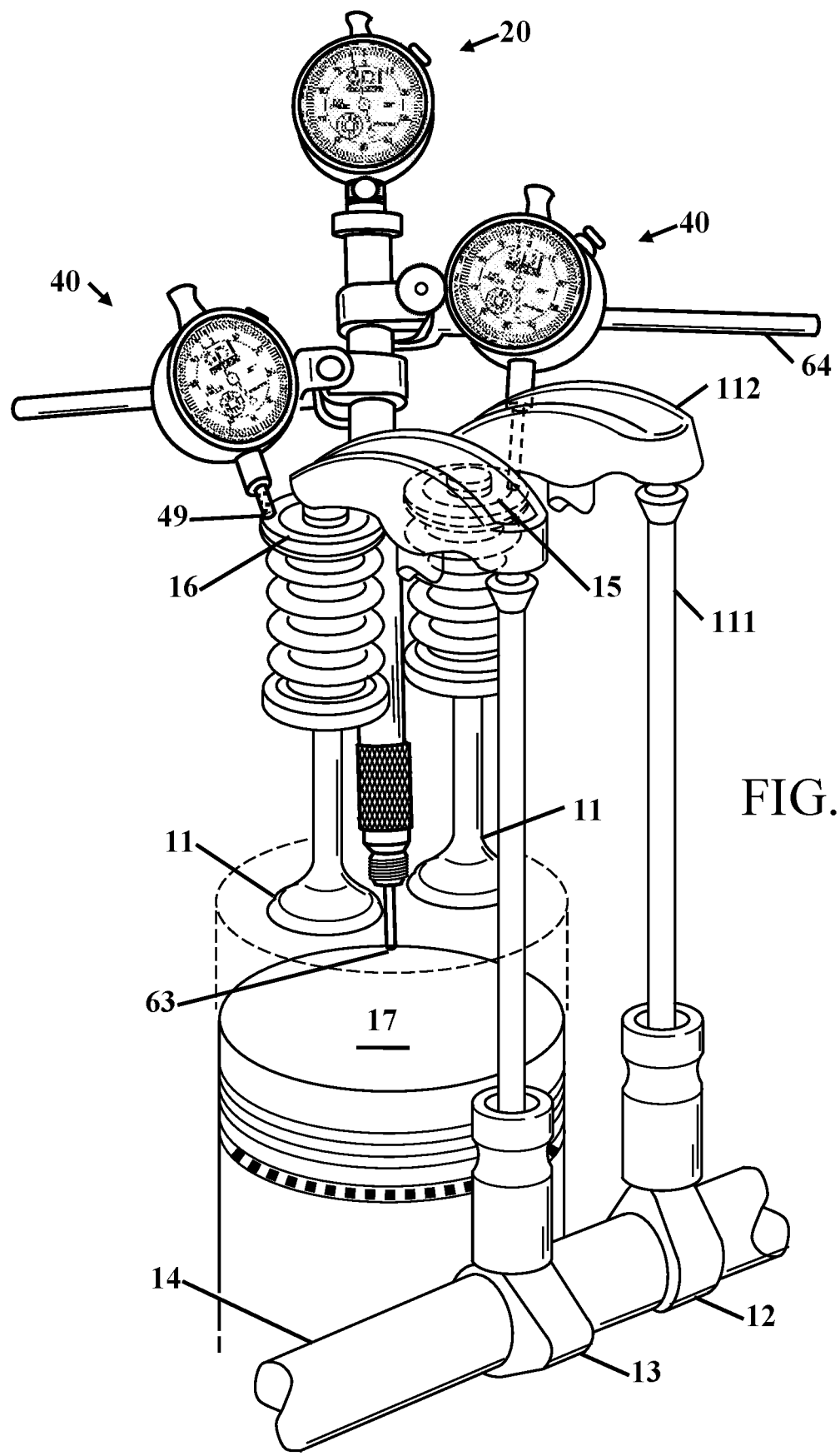

FIG. 1 shows a top dead center gauge set.
FIG. 2 shows the gauge set with the accessory components.
FIG. 3 shows the some of the components that make up piston gauge
FIG. 4 shows dial indicator with a bezel at the outer perimeter of the dial indicator.
FIG. 5 shows gauge mount.
FIG. 6 shows indicator shaft adjuster.
FIG. 7 shows the plug adaptor.
FIG. 8 shows extension shaft.
FIG. 9 shows the valvetrain gauge.
FIG. 10 shows a cut-away view of the gauge.
FIG. 11 the top dead center gauge in use.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | |
|---|---|
| 11 valve(s) | 12 exhaust cam lobe |
| 13 intake cam lobe | 14 cam shaft |
| 15 exhaust valve spring | 16 intake valve spring |
| 17 piston | 18 foam |
| 19 case | 20 piston gauge |
| 21 first grip ring | 22 second grip ring |
| 23 ring | 24 third grip ring |
| 30 dial indicator | 31 lock screw |
| 32 tip | 33 pin |

-continued

| Item Numbers and Description | |
|---|---|
| 34 pin sleeve | 35 course indicator |
| 36 dial indicator face | 37 indicating needle |
| 38 bezel | 39 hash mark(s) |
| 40 gauge mount | 41 planar surface |
| 42 threaded surface | 43 threaded surface |
| 44 bore | 46 first thumb screw |
| 47 threads | 50 body |
| 51 disconnected surface | 52 markings |
| 53 threaded surface 4 | 54 collar |
| 55 threaded surface 3 | 60 indicator shaft |
| 61 shaft end | 62 shaft |
| 63 shaft tip | 70 indicator shaft adjuster |
| 71 threaded surface 5 | 72 groove |
| 73 knurled face | 74 bore |
| 80 plug adaptor | 81 planar surface |
| 82 threaded surface | 83 plug thread tip |
| 84 planar surface | 85 keyed end |
| 86 planar face tip | 87 bore |
| 90 extension shaft | 91 elbow |
| 92 third thumb screw | 93 clamp body |
| 94 clamp hole | 95 pivot screw end |
| 96 shaft | 97 pin |
| 100 valvetrain gauge | 101 indicator clamp |
| 102 shaft clamp hole | 103 second thumb screw |
| 104 clamp hole | 105 indicator holder |
| 106 shaft | 107 threaded surface |
| 108 lock knob | 109 threaded surface |
| 110 knurled surface | 111 push rod |
| 112 rocker arm | |

FIG. 1 shows a top dead center gauge (TDCG). This figure shows the basic components of the TDCG. The central piston gauge 20 is threaded into the spark plug hole or any hole that allows access into the piston cylinder and or combustion chamber, where shaft tip 63 of the piston gauge comes into contact with the piston, converting the linear motion of the piston into rotational motion by the course indicator 35 and indicating needle 37. The body 50 of the piston gauge 20 allows for the securing and positioning of the extension shaft(s) 90 that support the dial indicator(s) 30 for the valvetrain gauge(s) 100 which are positioned, so their tip(s) 32 can come into contact with the valvetrain components: valve stems, valve springs, spring retainer, valve keepers, rocker arms, push rods, hydraulic/solid lifters, and cam shafts. This gives the TDCG the ability to track all valvetrain components at one time to set engine timing.

FIG. 2 shows the TDCG with its components. The TDCG can be transported in a travel enclosure case 19. The components are suspended and spaced in foam 18 to prevent damage and to keep them in a secure position. In the center of the case 19 is the piston gauge 20. There is at least one dial indicator 30 for each of the extension shafts 90. The dial indicator 30 is retained on the extension shaft 90 on third shaft 96 with indicator clamp 101 and indicator holder 105. Also included in the case is a variety of plug adapters 80 that can be threaded onto the end of the piston gauge 20, so to adapt to different engines with US, metric or other thread pitches and diameters. A more detailed image and description of these components is found in the following figures and text.

FIG. 3 shows the some of the components that make up piston gauge 20. There is a dial indicator 30 at the top end of the piston gauge which is held by the gauge mount 40. The dial indicator 30 is secured in position by first thumb screw 46. The body 50, an elongated shaft, retains indicator shaft 60 and has a shaft end 61, along with indicator shaft adjuster 70 and plug adaptor 80. The shaft 62, may extend passed the planar face tip 86, FIG. 10, at a predetermined distance, into the engine cylinder and or combustion chamber, so that tip 63 may come into contact with the piston, as it cycles into the uppermost portion of the cylinder. The shaft 62 passes through the body 50, as it then makes contact with tip 32 on dial indicator 30. The linear movement of pin 33 extends out of a pin sleeve 34. Movement of the tip 32 is converted into a rotational movement at needle 37 in dial indicator 30.

FIG. 3 also shows at least one disconnected surface 51 on body 50. Adjacent to disconnected surface 51 are markings 52 which may indicate position of indicator shaft adjuster 70. In the body 50 is a fourth threaded surface 53 to receive indicator shaft adjuster 70. Collar 54 is secured at the bottom end of body 50 by ring 23, FIG. 10. There is also a first grip ring 21 at the top body 50. The indicator shaft 60 may extend the entire length of body 50 where shaft 60 may pass through indicator shaft adjuster 70 through third bore 74 and through plug adaptor 80 at second bore 87.

FIG. 4 shows dial indicator 30 with a bezel 38 at the outer perimeter of the dial indicator 30. The bezel 38 may be part of the dial indicator face 36, imprinted with a predetermined number of hash mark(s) 39. In the embodiment shown, the display shows increment in inches or 0.001 inch, but metric measurements are also contemplated. The bezel 38 can be rotated 360 degrees to orient the dial indicator face 36 in relation to indicating needle 37. As the crank is rotated, the needle 37 will rotate clock wise or counter clock wise as tip 32 is moved, indicating whether the piston is moving away or near top dead center of its stroke. Once top dead center has been determined, the bezel 38 may be locked in position by the lock screw 31. Testing has shown that the mechanical analog gauges can provide a visible indicator of movement between hashes or other indicia. At least one or more dial indicator(s) 30 may be used where the first dial indicator may be placed over the intake valve and the second dial indicator may be placed over the exhaust valve.

FIG. 5 Shows gauge mount 40 with second thread surface 42, which may be secured into the third thread surface 55 of body 50. It has been contemplated that a socket or coupling type connection may achieve the same result. The second threaded surface 42 can be of standard or metric thread, and vary in size and pitch. The third thread surface 55 can be of standard or metric thread, and vary in size and pitch. The second threaded surface 42 and the third threaded surface 55 may be of left-handed thread. gauge mount 40 may have at least one first planer surface 41 that may be used to attach a tool to secure or remove the piston gauge into or out of the engine cylinder and or combustion chamber. Indicator mount 40 may also accept dial indicator 30 through a predetermined hole dimension at the first bore 44 of gauge mount 40. First thumb screw 46 with threads 47 may be use to secure the dial indicator 30 to the indicator mount 40 using the first threaded surface 43 on indicator mount 40.

FIG. 6 shows indicator shaft adjuster 70 with fifth threaded surface 71 and a groove 72. The fifth threaded surface 71 can be of standard or metric thread, and vary in size and pitch. Indicator shaft adjuster 70 may be received by the fourth threaded surface 53 on body 50. There is a second grip ring 22 at the end of the indicator shaft adjuster. A change in displacement may occur when the knurled face 73 is turned clock wise or counter clockwise. The change in displacement may be referenced by the markings 52 on body 50.

FIG. 7 shows plug adaptor 80 with plug thread tip 82 with standard or metric thread, varying in size and thread pitch. Opposite to plug thread tip 82 is keyed end 85 with the at least one second planar surface 84 and at least one third planar surface 81. The plug adaptor 80 may be inserted into the bottom end of the body 50 where it is secured by the collar 54 and the third grip ring 24. The plug adaptor 80 may be threaded and secured into the engine cylinder and or combustion chamber, by plug thread tip 83 that matches the pitch and diameter of the spark plug hole.

FIG. 8 shows extension shaft 90 and associated components that enable the mounting and positioning of dial indicator 30. The majority of the body 50 is smooth to allow for the clamp body 93 to pass through at second clamp hole 94. Elbow 91 joins clamp body 93 at pivot screw end 95 and third shaft 96 at pin 97 becoming a unified member to support valvetrain gauge 100. The third shaft 96 may pivot at the pivot screw end 95 to allow for the positioning of the valvetrain gauge(s) 100. The extension shaft 90 may be fixed in position by turning third thumb screw 92.

FIG. 9 shows the valvetrain gauge and components needed to secure the dial indicator 30 to extension shaft 90 at shaft 96. The seventh thread surface 107 mates to mount face 38 by mount hole 39 as shown in FIG. 4, and secured by lock knob 108 at eighth threaded surface 109 using knurled surface 110. Second shaft 106 is inserted into first clamp hole 104 on indicator clamp 101. The third shaft 96 passes through shaft clamp hole 102. The indicator clamp 101 provides an axis of rotation relative to the third shaft 96 allowing for the positioning of the dial indicator 30. Tightening the second thumb screw 103 of the indicator clamp 101 will lock the dial indicator 30 in position relative to extension shaft 90 and piston gauge 20. A more detailed image and description of how these components are used is found in the following figure and text.

It is an object of the TDCG to detect when both intake and exhaust valves are in closed position relative to piston TDC. FIG. 11 shows the piston gauge 20 is threaded into the head of the engine so that tip 63 can come into contact with the top of the piston 17 as the piston moves in proximity to the top of the stroke. The movement of the piston can be viewed from the dial indicators, in this case, indicating needle 37 and course indicator 35. The intake and exhaust valves are driven by a cam shaft which are connected to the crankshaft. In some engines there may be a single cam shaft 14 that operates both the intake and exhaust vales by contact with exhaust cam lobe 12 and intake cam lobe 13. As the cam rotates in relation to the crankshaft, lobs 12 and 13 will move or lift pushrod(s) 111 upward, lifting or rocking the rocker arm(s) 112 which will push down on the valves(s) 11. The movement of the valves can be viewed from the dial indicator, needle 37 and course indicator 35. Other engines may use separate cam shafts for individual banks of intake and exhaust valves. The cams are synchronized with the crank that drives the piston, but in some cases, the relationship between the crank and the cams may not be known and the instruments allow for identifying the position of the cam 14 in relation to piston 17. Once top dead center has been identified, adjustments to the valvetrain can be made to position valvetrain components in accordance to factory recommendations.

While the tip 32 of the dial indicator(s) 30 are positioned to measure the movement of the valve(s) 11, the dial indicator(s) 30 could also be positioned to show movement of the valve stein, intake valve springs 16, exhaust valve spring 15, spring retainer, valve keepers, rocker arm 112, push rod 111, hydraulic/solid lifters, and cam lobs. The combined viewing of these three measurements allows for locating and synchronizing the valvetrain with piston 17.

Thus, specific embodiments of a top dead center gauge set have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A device to detect when a piston has reached an upper limit of a piston stoke in a reciprocating engine, and simultaneously detect a valvetrain component position on said reciprocating engine, whereby a position of said piston and said valvetrain component is relayed to the user by instruments attached to said device comprising:

a piston gauge having an elongated body, whereby said elongated body has a grip surface that is configured to insert and remove said piston gauge from a combustion chamber access hole into a piston cylinder and/or a combustion chamber as a single member;

a body having a top end, a bottom end and a body access hole through an entire length of said body and further including at least one disconnected surface exposing an interior of said body;

a gauge mount with an external thread to attach to said top end of said body and a through hole to receive a dial indicator, whereby said dial indicator is secured in said through hole by a clamping force applied by a first thumb screw;

said dial indicator is configured to display movement of said piston as said piston reaches a highest point of a piston stroke;

said movement translates into position by an indicium of markings on a face of said dial indicator;

an indicator shaft adjuster located between said top end and said bottom end of said body;

said body having said through hole, extending along said entire length of said indicator shaft adjuster, whereby said through hole is configured to receive said indicator shaft adjuster;

a plug adapter having a through hole along a length of said plug adapter, that is keyed at a first end of said plug adapter, and further including a threaded surface and a plug thread tip on said plug adapter, whereby said plug thread tip is configured to be inserted into and out of said combustion chamber access hole of said piston cylinder and/or said combustion chamber;

a collar secured to the bottom end of said body that is configured to accept said keyed end of said plug adapter, such that said collar is securable to said plug adapter to said bottom end of said body;

an indicator shaft having a predetermined length having a shaft tip and a shaft end that is slidably fitted through said indicator shaft adjuster and said plug adapter, whereby said shaft tip extends beyond a planar face tip to contact said piston, whereby movement of said piston is transferred to said indicator shaft and then to said dial indicator, whereby said movement translates into position of said piston;

two extension shafts that are configured to be secured onto said elongated body, whereby said two extension shafts are disposed in a multitude of positions;

two valvetrain gauge assemblies that are configured to secure onto each of said two extension shafts, whereby said two valvetrain gauge assemblies are disposed in a multitude of positions; and each of said two valvetrain gauge assemblies is configured to detect a position of said valvetrain component, whereby said position of said valvetrain component is translated by an indicium of markings on said dial indicator.

2. The device according to claim 1, wherein said body access hole has a coupling at said top end that is configured to accept and secure said gauge mount at said external thread of said gauge mount.

3. The device according to claim 1, wherein said body has at least one area exposing said interior of said body that is configured to allow access for a displacement of the said indicator shaft adjuster.

4. The device according to claim 1, wherein said body has an indicium of markings such that a displacement of said indicator shaft adjuster is indicated.

5. The device according to claim 1, wherein said body has a keyed end at said bottom end of said body, with at least one planar outer surface that is configured to accept and secure said plug adapter.

6. The device according to claim 1, wherein said collar is secured at the bottom end of said body and said collar is configured to attach to said bottom end of said body and said collar has a grip surface consisting of ridges and/or grooves on an external surface of the said collar.

7. The device according to claim 1, wherein said collar is secured at a bottom end of said piston gauge and said collar is configured to receive said plug adapter for securing and removal of said plug adapter to said bottom end of said body.

8. The device according to claim 1, further includes an indicator mount that is configured with at least one planar surface adjacent to the said through hole, whereby said planar surface is a grip point for insertion and removal of said piston gauge.

9. The device according to claim 1, wherein said indicator shaft adjuster is configured to have a grip surface comprising of ridges and or grooves, whereby a displacement of said indicator shaft adjuster is shown on an axis of said body.

10. The device according to claim 1, wherein said indicator shaft adjuster is configured to displace said indicator shaft.

11. The device according to claim 1, wherein said plug adapter has a keyed end comprising of at least one external planar surface, along with at least one internal planar surface, both said external planar surface and said internal planar surface being adjacent to a bore of said plug adapter.

12. The device according to claim 11, wherein said keyed end of said plug adapter is configured such that said at least one planar surface of said plug adapter mates with a planar surface of said bottom end of said body.

13. The device according to claim 11, wherein said keyed end of said plug adapter is configured to be secured to said bottom end of the said body by said collar.

14. The device according to claim 11, wherein said at least one plug adapter has a plug thread tip that is an English thread or a metric thread.

15. The device according to claim 11, wherein said at least one internal planar surface of said plug adapter is configured to receive a tool whereby said tool is contiguous to said at least one internal planar surface of said plug adapter, thereby allowing for an insertion and/or a removal of said plug adaptor into said combustion chamber access hole.

16. The device according to claim 1, wherein said two extension shafts are configured to slide, rotate, and clamp along said length of said body.

17. The device according to claim 16, wherein said two extension shafts are configured to receive at least one valvetrain gauge assembly comprising:
   a second dial indicator that is configured to detect a valvetrain movement;
   an indicator holder, that attaches to a mount hole against a mount face of said second dial indicator;
   a lock knob, that secures said indicator holder to said second dial indicator, and
   an indicator clamp, that secures said second dial indicator to one of said two extension shafts.

18. The device according to claim 17, wherein said indicator clamp is configured to allow for an angular and/or a linear adjustment of at least one valvetrain gauge assemblies on at least one of said extension shafts.

19. The device according to claim 1, wherein a valvetrain position is determined by displacement of a valve, a solid lifter, a hydraulic lifter, a valve spring, a rocker arm, a cam lobe, a pushrod or a valve keeper.

20. The device according to claim 1, wherein at least one of said two valvetrain gauge assemblies or said piston gauge has an audible, electronic, electromagnetic, mechanical, or digital gauge instrument indicator.

* * * * *